(12) United States Patent
Muroi

(10) Patent No.: US 9,164,708 B2
(45) Date of Patent: Oct. 20, 2015

(54) PRINTING APPARATUS INCLUDING DOWNLOAD PRINTING PROCEDURE

(71) Applicant: BROTHER KOGYO KABUSHIKI KAISHA, Nagoya-shi, Aichi-ken (JP)

(72) Inventor: Kazushige Muroi, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 14/258,349

(22) Filed: Apr. 22, 2014

(65) Prior Publication Data

US 2014/0320913 A1 Oct. 30, 2014

(30) Foreign Application Priority Data

Apr. 25, 2013 (JP) ................................. 2013-092611

(51) Int. Cl.
*G06F 3/12* (2006.01)
*G06K 15/00* (2006.01)

(52) U.S. Cl.
CPC ............ *G06F 3/1211* (2013.01); *G06F 3/1271* (2013.01); *G06F 3/1287* (2013.01); *G06F 3/1263* (2013.01)

(58) Field of Classification Search
CPC ... G06F 3/1211; G06F 3/1215; G06F 3/1287; G06F 3/1271; G06F 3/1263; G06F 3/1282; G06F 3/12882
USPC ............ 358/1.13, 1.14, 1.15, 1.16, 1.18, 402, 358/448; 709/202, 220
See application file for complete search history.

(56) References Cited

U.S. PATENT DOCUMENTS

| 7,984,120 B2* | 7/2011 | Yoshida ........................ 709/220 |
| 8,699,067 B2* | 4/2014 | Ono ............................. 358/1.15 |
| 2001/0027469 A1* | 10/2001 | Torikai .......................... 709/202 |
| 2007/0081186 A1 | 4/2007 | Numata |
| 2012/0062939 A1 | 3/2012 | Miyazaki |

FOREIGN PATENT DOCUMENTS

| JP | H11212739 A | 8/1999 |
| JP | 2007-105937 A | 4/2007 |
| JP | 2007-196475 A | 8/2007 |
| JP | 2008-105214 A | 5/2008 |
| JP | 2012-059093 A | 3/2012 |

* cited by examiner

*Primary Examiner* — Gabriel Garcia
(74) *Attorney, Agent, or Firm* — Scully, Scott, Murphy & Presser, PC

(57) ABSTRACT

A processor performs receiving a print instruction of printing image files stored in a server; transmitting a first request to the server, the first request requesting the server to transmit, to the printing apparatus, attribute information with respect to each file, the attribute information being at least one of a property and a print setting with respect to each file, the property including at least one of a data size, a file type, and color information of each file; receiving the attribute information with respect to each file from the server; determining a priority order of each image file based on the attribute information; determining a sequence of downloading the files based on the priority order; transmitting a second request to the server based on the sequence, the second request requesting the server to transmit each file; receiving each file from the server; and printing images based on each file.

20 Claims, 9 Drawing Sheets

FIG.4

| SEQUENCE | URL | SIZE | NUMBER OF COPIES | FILE TYPE | COLOR |
|---|---|---|---|---|---|
| 1 | URL-A | 256k | 1 | PDF | MONOCHROMATIC |
| 2 | URL-B | 500k | 1 | JPG | COLOR |
| 3 | URL-C | 650k | 3 | PDF | COLOR |
| 4 | URL-D | 784k | 1 | PDF | COLOR |
| 5 | URL-E | 784k | 1 | PDL | MONOCHROMATIC |

FIG.8

| SEQUENCE | JOB | URL | SIZE | NUMBER OF COPIES | FILE TYPE | COLOR | DOWNLOADING STATE |
|---|---|---|---|---|---|---|---|
| 1 | J1 | URL-a | 256k | 1 | PDF | MONOCHROMATIC | STARTED |
| 2 | J2 | URL-b | 500k | 1 | JPG | COLOR | NOT STARTED |
| 3 | J3 | URL-c | 784k | 1 | PDF | COLOR | NOT STARTED |
| | J4 | URL-d | 784k | 1 | PDL | MONOCHROMATIC | |
| | J5 | URL-e | 650k | 3 | PDF | COLOR | |

FIG.9

| SEQUENCE | JOB | URL | SIZE | NUMBER OF COPIES | FILE TYPE | COLOR | DOWNLOADING STATE |
|---|---|---|---|---|---|---|---|
| 1 | J1 | URL-a | 256k | 1 | PDF | MONOCHROMATIC | STARTED |
| 2 | J2 | URL-b | 500k | 1 | JPG | COLOR | NOT STARTED |
| 3 | J5 | URL-e | 650k | 3 | PDF | COLOR | NOT STARTED |
| 4 | J3 | URL-c | 784k | 1 | PDF | COLOR | NOT STARTED |
| 5 | J4 | URL-d | 784k | 1 | PDL | MONOCHROMATIC | NOT STARTED |

50

PRINTING APPARATUS INCLUDING DOWNLOAD PRINTING PROCEDURE

CROSS REFERENCE TO RELATED APPLICATIONS

This application claims priority from Japanese Patent Application No. 2013-092611 filed Apr. 25, 2013. The entire content of the priority application is incorporated herein by reference.

TECHNICAL FIELD

The invention relates to a printing apparatus and the like.

BACKGROUND

Conventionally, in a printing system having a printing apparatus and a server, technology is known that a download request of image data is outputted from a printing apparatus to a server, the image data is downloaded from the server, and the printing apparatus performs printing based on the image data. Hereinafter, printing in accordance with the above-described procedure will be referred to as "download printing".

In technology relating to the download printing, for example, print jobs are preliminarily stored in a server, a user selects, through an operation panel of a printing apparatus, a print job to be printed from among the print jobs stored in the server, and the selected print job is downloaded to the printing apparatus and is printed.

SUMMARY

There are various types of image data that are downloaded from a server, for example, a type that enables start of printing promptly, a type that takes time to perform a preparation process prior to printing, such as analysis of the image data, and the like. However, the above-described technology does not take account of a sequence of downloading when selecting a plurality of image files and performing download printing. Hence, there is a room for improvement.

In view of the foregoing, according to one aspect, the invention provides a printing apparatus. The printing apparatus includes an interface, a printing device configured to perform printing based on image files, a processor, and a memory storing instructions. When executed by the processor, the instructions cause the processor to perform: receiving a print instruction of controlling the printing device to print a plurality of image files stored in a server; transmitting a first request to the server via the interface, the first request requesting the server to transmit, to the printing apparatus, attribute information with respect to each of the plurality of image files stored in the server, the attribute information being at least one of a property and a print setting with respect to each of the plurality of image files, the property including at least one of a data size, a file type, and color information of each of the plurality of image files; receiving the attribute information with respect to each of the plurality of image files from the server via the interface; determining a priority order of each of the plurality of image files based on the attribute information; determining a sequence of downloading the plurality of image files based on the determined priority order; transmitting a second request to the server via the interface based on the determined sequence, the second request requesting the server to transmit each of the plurality of image files; receiving each of the plurality of image files from the server via the interface; and controlling the printing device to print images based on each of the plurality of image files.

According to another aspect, the invention also provides a method of printing image files with a printing apparatus having a printing device. The method includes: receiving a print instruction of controlling the printing device to print a plurality of image files stored in a server; transmitting a first request to the server via an interface, the first request requesting the server to transmit, to the printing apparatus, attribute information with respect to each of the plurality of image files stored in the server, the attribute information being at least one of a property and a print setting with respect to each of the plurality of image files, the property including at least one of a data size, a file type, and color information of each of the plurality of image files; receiving the attribute information with respect to each of the plurality of image files from the server via the interface; determining a priority order of each of the plurality of image files based on the attribute information; determining a sequence of downloading the plurality of image files based on the determined priority order; transmitting a second request to the server via the interface based on the determined sequence, the second request requesting the server to transmit each of the plurality of image files; receiving each of the plurality of image files from the server via the interface; and controlling the printing device to print images based on each of the plurality of image files.

According to still another aspect, the invention also provides a non-transitory computer-readable storage medium storing computer-readable instructions. When executed by a processor of a printing apparatus having a printing device, the computer-readable instructions cause the processor to perform: receiving a print instruction of controlling the printing device to print a plurality of image files stored in a server; transmitting a first request to the server via an interface, the first request requesting the server to transmit, to the printing apparatus, attribute information with respect to each of the plurality of image files stored in the server, the attribute information being at least one of a property and a print setting with respect to each of the plurality of image files, the property including at least one of a data size, a file type, and color information of each of the plurality of image files; receiving the attribute information with respect to each of the plurality of image files from the server via the interface; determining a priority order of each of the plurality of image files based on the attribute information; determining a sequence of downloading the plurality of image files based on the determined priority order; transmitting a second request to the server via the interface based on the determined sequence, the second request requesting the server to transmit each of the plurality of image files; receiving each of the plurality of image files from the server via the interface; and controlling the printing device to print images based on each of the plurality of image files.

BRIEF DESCRIPTION OF THE DRAWINGS

Embodiments in accordance with the invention will be described in detail with reference to the following figures wherein:

FIG. 4 is an explanatory diagram showing an example of a request array;

FIG. 8 is an explanatory diagram showing an example of a request array to which jobs are added; and FIG. 9 is an explanatory diagram showing an example of a request array in which a downloading-sequence is redetermined.

DETAILED DESCRIPTION

A printing apparatus according to an embodiment of the invention will be described while referring to the accompanying drawings. In the present embodiment, the invention is applied to a multifunction peripheral (MFP) having an image foaming function.

Figure 1:
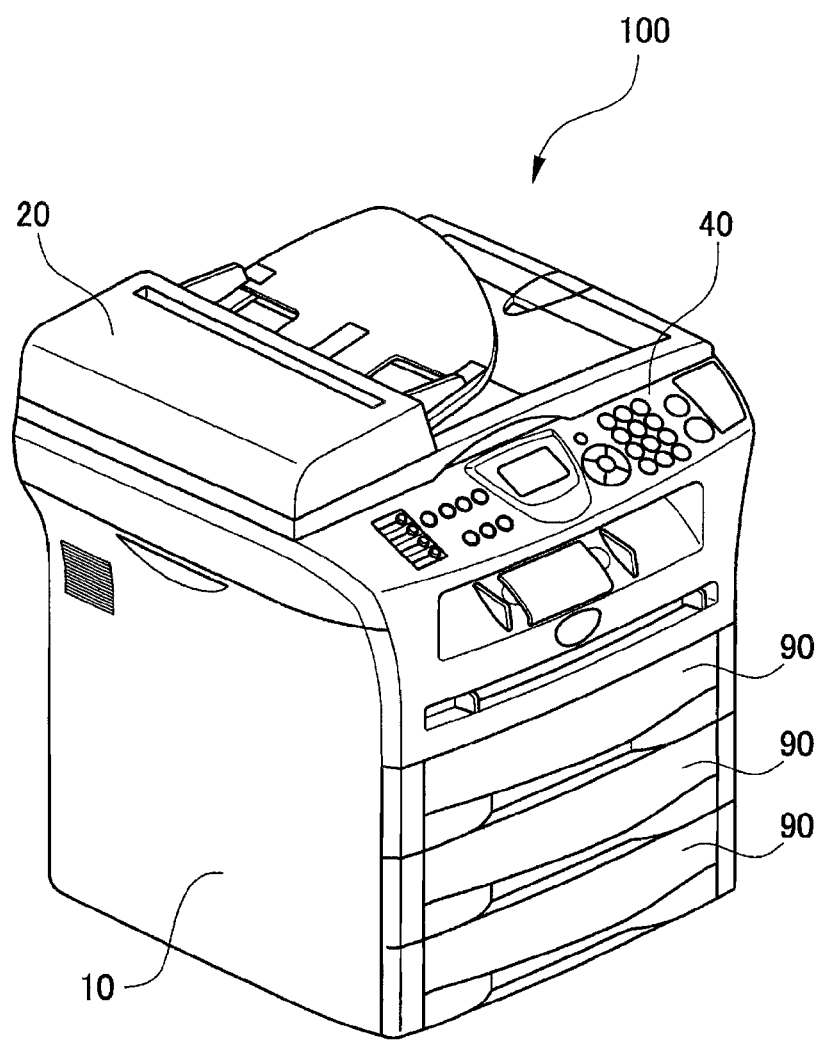
FIG. 1 is a perspective view showing an MFP according to an embodiment.

As shown in FIG. 1, an MFP 100 of the embodiment includes an image forming device 10 that forms an image on a sheet and an image reading device 20 located at the upper side of the image forming device 10. An operation panel 40 having a liquid crystal display, various keys, and the like is provided at the front side (the near side) of the image reading device 20. The operation panel 40 enables displaying of an operating status and enables an input operation by a user. Sheet feeding trays 90 are provided at the lower side of the image forming device 10. The sheet feeding trays 90 accommodate sheets on which images are formed by the image forming device 10. The MFP 100 of the present embodiment has a plurality of sheet feeding trays 90. The MFP 100 is an example of a printing apparatus, and each sheet feeding tray 90 is an example of a sheet feeder.

Figure 2:
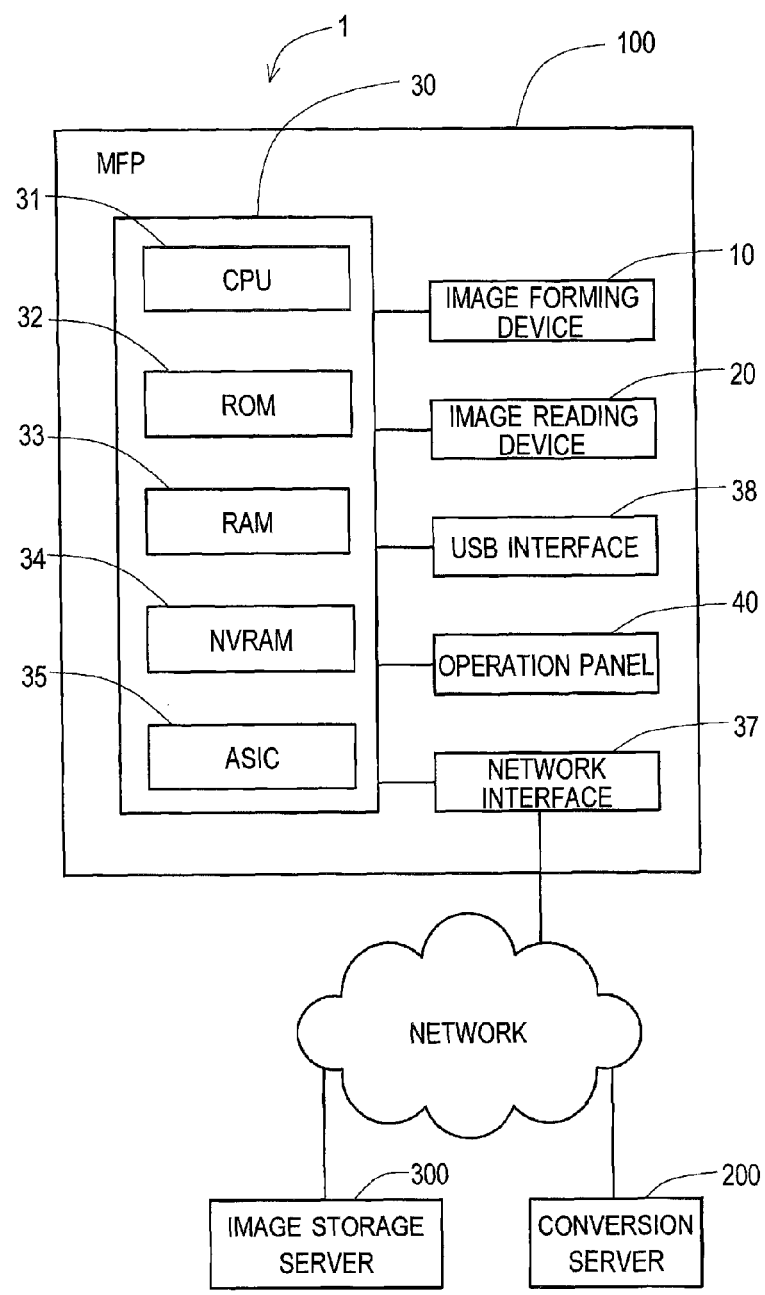
FIG. 2 is a block diagram showing a printing system using the MFP.

As shown in FIG. 2, a printing system 1 of the present embodiment includes the MFP 100, a conversion server 200, and an image storage server 300, which can communicate with each other through a network such as Internet. The conversion server 200 is an example of an external device that performs a conversion process. The image storage server 300 is an example of a server. A combination of the MFP 100 and the image storage server 300 is an example of a printing system.

The MFP 100 has a function of receiving, through the network, image data stored in the image storage server 300, and of performing printing based on the received image data. This printing is download printing. Upon receiving an instruction for download printing, the MFP 100 transmits a request to the image storage server 300. The request is for transmission of the image data to the MFP 100. Note that the MFP 100 can also receive image data with a print instruction from a PC or the like and perform printing.

The conversion server 200 is a computer having a device driver for the MFP 100. The conversion server 200 has a function of converting image data of various formats (file types) stored in the image storage server 300 into data of a format that can be analyzed by the MFP 100. Note that the conversion server 200 may be realized by a single computer, a plurality of computers, a cloud system, or the like.

The image storage server 300 stores various image data, and supplies stored image data through the network such as Internet. The image storage server 300 may be realized by a single computer, a plurality of computers, a cloud system, or the like. By instructing the MFP 100 to perform download printing, a user can select a desired image data from among image data stored in the image storage server 300, and request printing at the MFP 100. Hereinafter, receiving image data stored in the image storage server 300 through the network is referred to as "downloading".

The MFP 100 may download image data directly from the image storage server 300, or may download image data via an external device such as the conversion server 200. For example, if the MFP 100 cannot analyze downloaded image data by itself, the MFP 100 transmits the image data to the conversion server 200 which converts the image data into analyzable image data. Further, for example, at the time of downloading image data stored in the image storage server 300, the MFP 100 downloads the image data via the conversion server 200, thereby downloading converted image data.

Note that image data stored in the image storage server 300 include data of various types (kinds). For example, the image data include PDF data, TIFF data, JPEG data, and the like. The image data also include text data and data specific to a certain application. The MFP 100 is capable of analyzing PDL data that has been converted by a device driver for the MFP 100 itself, postscript data, and so on. On the other hand, many of data of various types described above cannot be analyzed by the MFP 100. Hence, if image data for which download printing is instructed by the MFP 100 is data that cannot be analyzed by the MFP 100, a conversion process by the conversion server 200 is needed for perform printing appropriately. Examples of the conversion process are a PDL (page description language) conversion process and a RIP (raster image processor) process.

Next, the electrical configuration of the MFP 100 will be described. As shown in FIG. 2, the MFP 100 has a main controller 30 including a CPU 31, a ROM 32, a RAM 33, an NVRAM (nonvolatile RAM) 34, and an ASIC 35. The MFP 100 also has an image forming device 10, an image reading device 20, a network interface 37, a USB interface 38, and an operation panel 40, which are electrically connected to the main controller 30.

The image forming device 10 is for printing an image on a sheet of paper. In the MFP 100 of the present embodiment, the image forming device 10 is a page printer of an electrophotographic type. The image forming device 10 may be capable of forming a color image, or may be capable of forming only a monochromatic image. The image forming device 10 is an example of a printing device. The image reading device 20 is for reading (scanning) an image on an original document. The reading mechanism may be CCD or CIS. The image reading device 20 may be capable of reading a color image, or may be capable of reading only a monochromatic image.

The ROM 32 stores various control programs for controlling the MFP 100, various settings, default values, and the like. The RAM 33 is used as work areas to which various control programs are read out, or as storage areas in which data is stored temporarily.

The CPU 31 controls each element of the MFP 100, while storing the processing results in the RAM 33 and the NVRAM 34 based on the control programs read out from the ROM 32. The CPU 31 is an example of a processor, an acquirer, and a determiner. Here, the main controller 30 may be a processor, or the ASIC 35 may be a processor. Note that the main controller 30 in FIG. 2 is a collective term including hardware used for controlling the MFP 100, such as the CPU 31. Thus, the main controller 30 does not necessarily mean a single hardware that is actually provided in the MFP 100.

The network interface 37 is hardware for performing communication with the network through a LAN cable or the like. The USB interface 38 is hardware for performing communication with an apparatus connected through a USB cable or the like. The network interface 37 and the USB interface 38 are an example of a data receiver. The operation panel 40 performs various displays for a user, and receives an instruction input by the user.

Next, the procedure of download printing executed by the MFP 100 will be described while referring to the sequence chart of FIG. 3. In this chart, the operations of each of the user, the MFP 100, and the image storage server 300 are shown in the sequence of execution from the upper side to the lower side along the vertical dashed lines. The central dashed line shows the operations of the MFP 100, the left-side dashed line shows the operations of the user, and the right-side dashed line shows the operations of the image storage server 300. Further, the lateral arrows connecting the vertical dashed lines in FIG. 3 indicate directions in which information travels.

The procedure of download printing is started when an instruction for download printing is received by the MFP 100. The instruction for download printing is, for example, inputted by the user by using the operation panel 40. Note that the MFP 100 is also capable of receiving the instruction for download printing through the network interface 37 or the USB interface 38.

The user wishing to perform download printing from the image storage server 300, first, uses the operation panel 40 or the like to input, in the MFP 100, login information for logging in to the image storage server 300. For example, a combination of a user ID and a password is used as the login information. The MFP 100 transmits the inputted login information to the image storage server 300. If the image storage server 300 permits the login, the user can use the image storage server 300 through the MFP 100.

Next, the MFP 100 makes a request to the image storage server 300 for a file list that can be downloaded by the user identified by the login information. Further, the MFP 100 displays, on the operation panel 40, tabulated downloadable files based on the file list returned from the image storage server 300. By referring to this display, the user selects a file for which download printing is to be performed.

The MFP 100 receives, as one job, a file to be printed based on the user's print instruction. The user can select a plurality of files from the table displayed based on the file list. That is, if an input for instructing execution of download printing is received in a state where a file is selected, the MFP 100 is capable of receiving one or plurality of jobs. Here, one selected file is treated as one job. There are such files stored in the image storage server 300 that one file includes a plurality of print pages or a plurality of image data. Such file is treated as one job.

If a plurality of jobs is received, the MFP 100 determines a downloading sequence based on a predetermined rule. More specifically, the MFP 100 determines a priority order of each of files stored in the image storage server 300. Then, the MFP 100 determines downloading sequence based on the priority order of the files such that the MFP 100 requests transmission of the files based on the downloading sequence from the image storage server 300. The MFP 100 of the present embodiment stores each job in the request array based on the determined downloading sequence. A method of determining the downloading sequence will be described later.

Here, the request array will be described while referring to an example of FIG. 4. A request array 50 stores one or plurality of received jobs in a sequence in which downloading is to be performed. The request array 50 is generated in the RAM 33. In the request array 50 shown in FIG. 4, properties of jobs and print settings of the jobs are stored such that jobs are arranged from the top to the bottom in the figure in the sequence in which downloading is to be performed.

The property of a job is information attached to image data stored in the image storage server 300, and is attached to the file list returned from the image storage server 300. The print setting of a job is information attached to a print instruction, and is set when the print instruction is received. The property of each job stored in the request array 50 includes a URL of a download source, a data size of a file, a file type of image data, color information of image data, and the like. The print setting of each job includes the number of print copies, information of whether color printing is set, information of which sheet feeding tray 90 is to be used, and the like.

And, the MFP 100 sequentially makes a request of downloading of the received jobs to the image storage server 300 and executes downloading of the jobs, one job at a time, based on the downloading sequence stored in the request array 50. Upon finishing downloading of a file that has been requested to the image storage server 300, the MFP 100 deletes the job from the request array 50. Then, because the next job becomes the first job of the request array 50, the same process is performed for this job, and this process is repeated until the request array 50 becomes empty (that is, there is no job in the request array 50).

Further, the MFP 100 performs a printing process of image data for which downloading is completed. The sequence of jobs to perform the printing process is the same as the sequence of downloading. Note that, even if the printing process of the preceding job is not finished, downloading of the next job can be started. That is, the MFP 100 is capable of performing downloading and printing in parallel.

Figure 3:
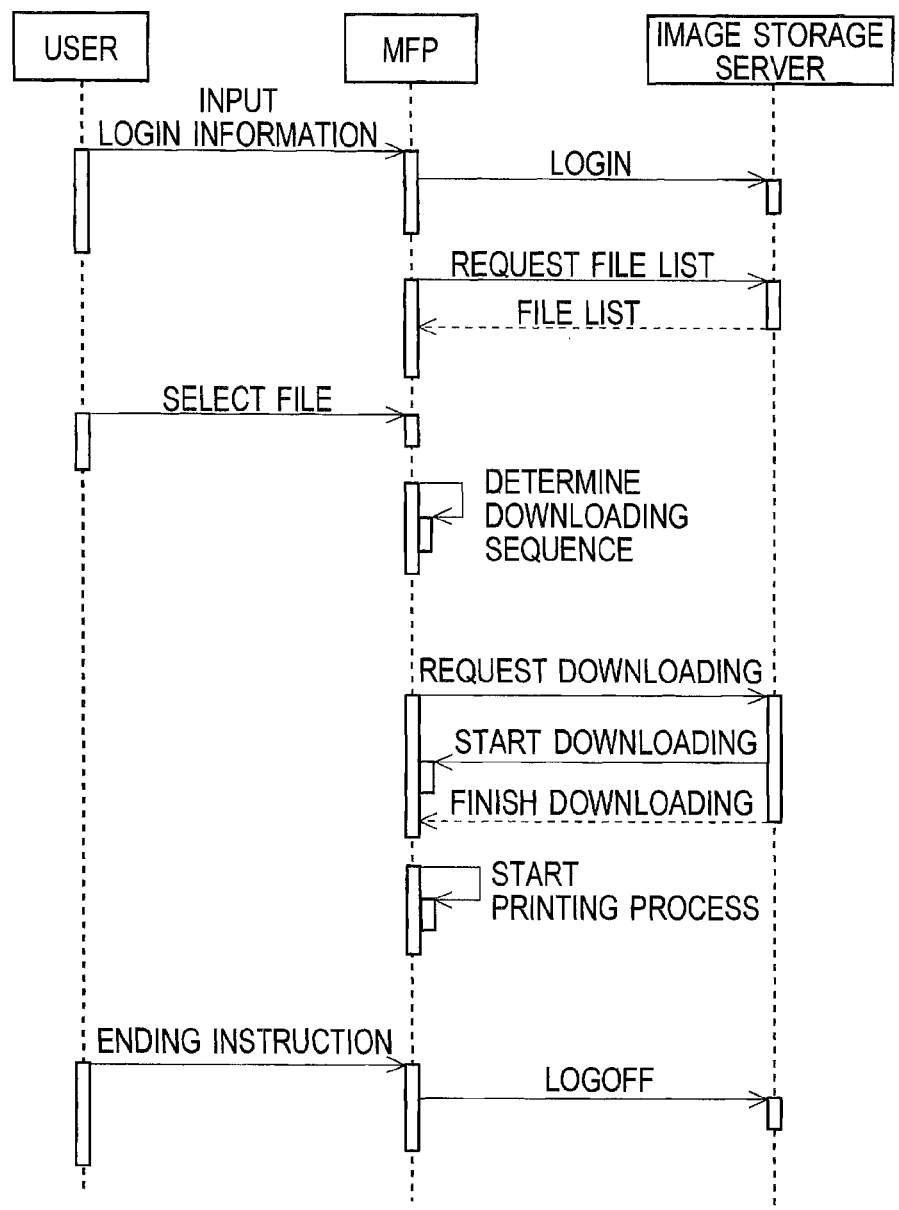
FIG. 3 is a sequence chart showing the procedure of download printing.

The MFP 100 repeats a series of processes from "request downloading" to "start printing process" shown in FIG. 3, until there is no image data to which a print instruction has been given. That is, download printing is repeated until downloading and printing process of all the jobs stored in the request array 50 are finished. At the time when download printing is finished, all the jobs stored in the request array 50 are deleted and the request array 50 is empty, and also printing of downloaded image data is all finished.

Further, if an ending instruction is received from the user after download printing is finished, the MFP 100 transmits a logoff instruction to the image storage server 300. Then, the sequence of FIG. 3 including download printing ends. Here, after selecting a file and giving an instruction of download printing, the user can further selects a file and perform download printing. In that case, a login state may be kept to repeat the steps of "select file" and thereafter.

Next, the procedure of a download printing process executed by the MFP 100 for realizing the above-described download printing will be described while referring to the flowchart of FIG. 5. The download printing process is executed by the CPU 31, triggered by reception of an instruction for download printing.

Upon starting execution of the download printing process, the CPU 31 first controls the operation panel 40 to display a screen prompting an input of login information, and acquires the login information for logging in to the image storage server 300 based on the input of the user (S101). Upon acquiring the login information, the CPU 31 transmits the acquired login information to the image storage server 300 (S102). If login is successful, the MFP 100 is allowed to use services of the image storage server 300.

If the login to the image storage server 300 is successful, the MFP 100 acquires file list information from the image storage server 300 (S103). For example, if the login user preliminarily prepares a list of printable files on the image storage server 300, the MFP 100 acquires the file list information from the image storage server 300. Or, the CPU 31 may control the operation panel 40 to display a site (location) or the like on the image storage server 300, and may acquire a list of image data included in the site. Then, the CPU 31 of the MFP 100 may control the operation panel 40 to display the acquired file list information (S104).

Subsequent to S104, the MFP 100 receives a print instruction of a file. For example, the user selects a file which he or she wishes to print from the displayed file list, and operates the print instruction button. The CPU 31 of the MFP 100 determines that the file of which the print instruction has been received is a print file to be printed (S105). After receiving the user's input for selecting the file and determining the print file for which download printing is to be performed, the CPU 31 of the MFP 100 executes a downloading-sequence determining process (S106).

Figure 6:
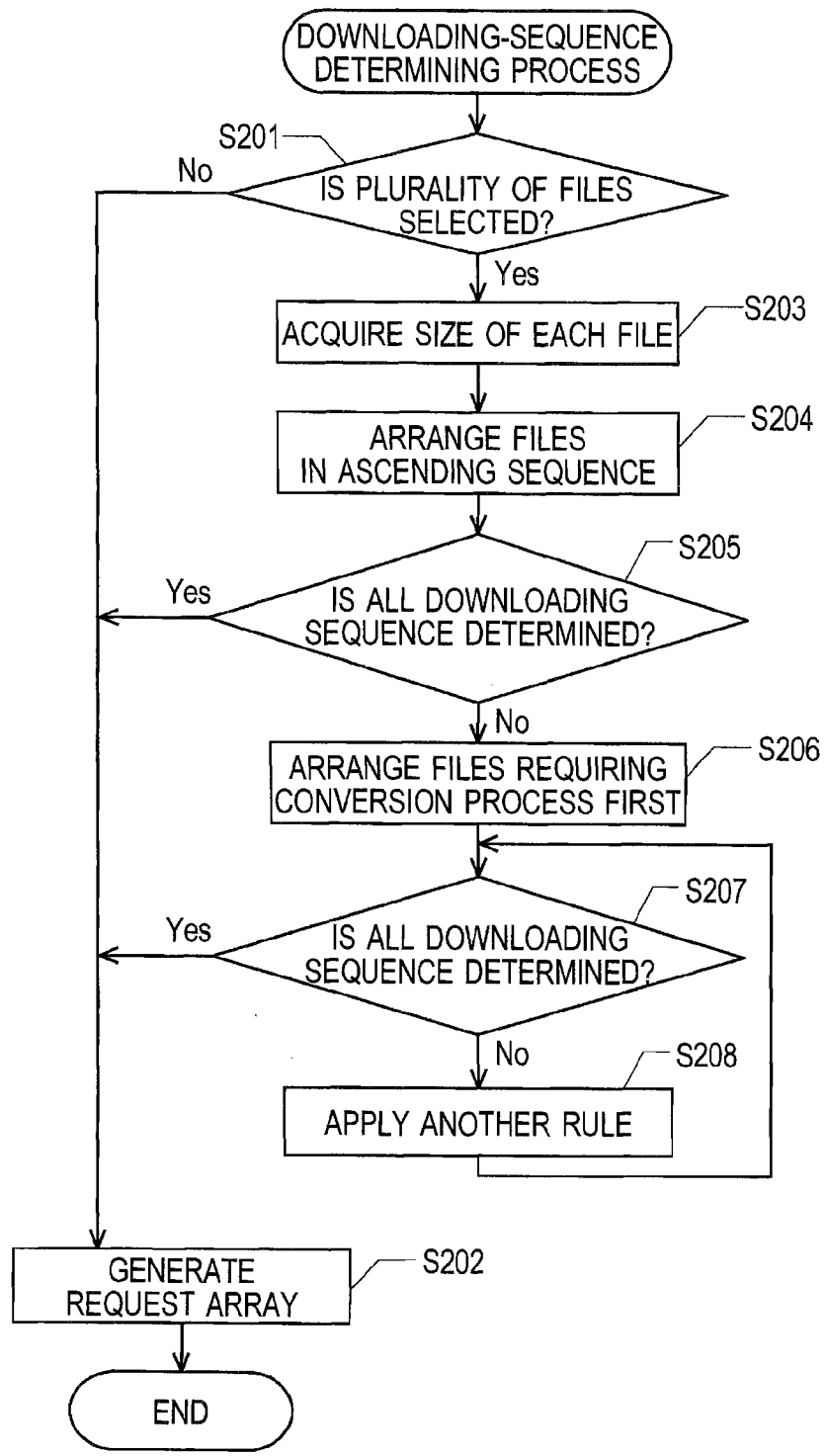
FIG. 6 is a flowchart showing the procedure of a downloading-sequence determining process.

Next, the procedure of the downloading-sequence determining process in S106 will be described while referring to the flowchart of FIG. 6. Upon starting execution of the downloading-sequence determining process, the CPU 31 first determines whether the number of print files is plural (S201). If the number of selected print files is only one (S201: No), there is no need to determine the sequence. Hence, the CPU 31 generates the request array 50 (S202), and finishes the downloading-sequence determining process. In this case, the request array 50 stores only one job based on the selected print file.

On the other hand, if it is determined that the number of selected print files is plural (S201: Yes), the CPU 31 of the MFP 100 acquires a data size of each print file from the file list (S203). Then, each print file is arranged in the ascending sequence from the print file having a small data size (S204). A print file of a larger data size is likely to take a longer time for downloading. In other words, the CPU 31 assigns the highest priority order to the print file having the smallest data size. As shown in FIG. 4, a data size of the file with "URL-A" is the smallest one in the request array 50. Thus, the file with "URL-A" has the highest priority order "1" assigned, and the file with "URL-A" should be first downloaded (that is, the first in the downloading sequence). Hence, by first downloading a print file, assigned with the highest priority order, having the smallest data size, it can be expected to shorten time prior to obtaining the first sheet of a print output. That is, as a predetermined rule, the MFP 100 determines the downloading sequence such that a print file having a smaller data size is prioritized over a print file having a larger data size.

Next, the CPU 31 of the MFP 100 determines whether the sequence is determined in S204 for all the print files, without two or more print files of the same rank (S205). If it is determined that the downloading sequence of the print files is determined (S205: Yes), the CPU 31 generates the request array 50 (S202) and finishes the downloading-sequence determining process. In this case, the request array 50 stores a plurality of jobs based on the selected print files, based on the determined sequence of the print files.

On the other hand, for example, as shown in the example of FIG. 4, if there are print files having the same data size in the selected print files, those print file are the same rank in S204. Hence, if it is determined that the downloading sequence is not determined for all the print files (S205: No), the CPU 31 of the MFP 100 determines the sequence in more detail by applying a different rule to the print files of the same rank.

As a different rule, the MFP 100 of the present embodiment determines the downloading sequence such that a print file requiring a conversion process by the conversion server 200 is prioritized over a print file not requiring the conversion process. Thus, the CPU 31 of the MFP 100 arranges print files of the same rank in S204, such that the print file requiring the conversion process comes first (S206).

Here, a print file requiring a conversion process by the conversion server 200 is a print file including image data that cannot be analyzed by the MFP 100. Whether the conversion process is required can be determined from the file type of the print file. For example, it can be determined by preliminarily storing analyzable file types in the MFP 100 and by determining whether the stored analyzable file types include the file type of the print file. The conversion process includes, for example, a conversion process from a document file or a chart or spreadsheet file to a PDL file and a conversion process from a PDL file to bitmap data.

There is a possibility that the conversion process by the conversion server 200 takes time to some extent. Further, while the conversion server 200 executes the conversion process, the MFP 100 can proceed with downloading of the next file. That is, the MFP 100 first performs downloading of a file requiring a conversion process, and performs downloading of the next file in parallel with the conversion process at the external device. With this process, there is a possibility that time required for the entire download printing can be shortened.

Next, the CPU 31 of the MFP 100 determines whether the downloading sequence of all the print files is determined by the process of S206 (S207). If it is determined that the downloading sequence of all the print files is determined (S207: Yes), the CPU 31 generates the request array 50 based on the determined sequence (S202), and finishes the downloading-sequence determining process.

On the other hand, if it is determined that the downloading sequence of all the print files is not determined (S207: No), the CPU 31 of the MFP 100 applies another different rule to the print files of the same rank (S208). The different rule may be, for example, that a print file having a print setting of plural copies is prioritized over a print file having a print setting of a single copy. In printing of plural copies, the MFP 100 repeats a printing process a plurality of times by using the same image data. Because printing of plural copies takes time to some extent, the MFP 100 performs downloading of the next print file and other processes (extraction of data or the like) during that time. With this process, there is a possibility that time required for the entire download printing can be shortened.

Subsequent to S208, the CPU 31 determines whether the downloading sequence of all the print files is determined (S207). If the downloading sequence of all the print files is not yet determined (S207: No), the CPU 31 applies still another different rule (S208), and repeats S207 and S208 until all the downloading sequence is determined. If the downloading sequence of all the print files is determined (S207: Yes), the CPU 31 generates the request array 50 based on the determined sequence (S202) and finishes the downloading-sequence determining process. If the sequence is not determined after all the predetermined rules are applied, print files of which the sequence is still undetermined may be arranged in the sequence of the list.

Figure 7:
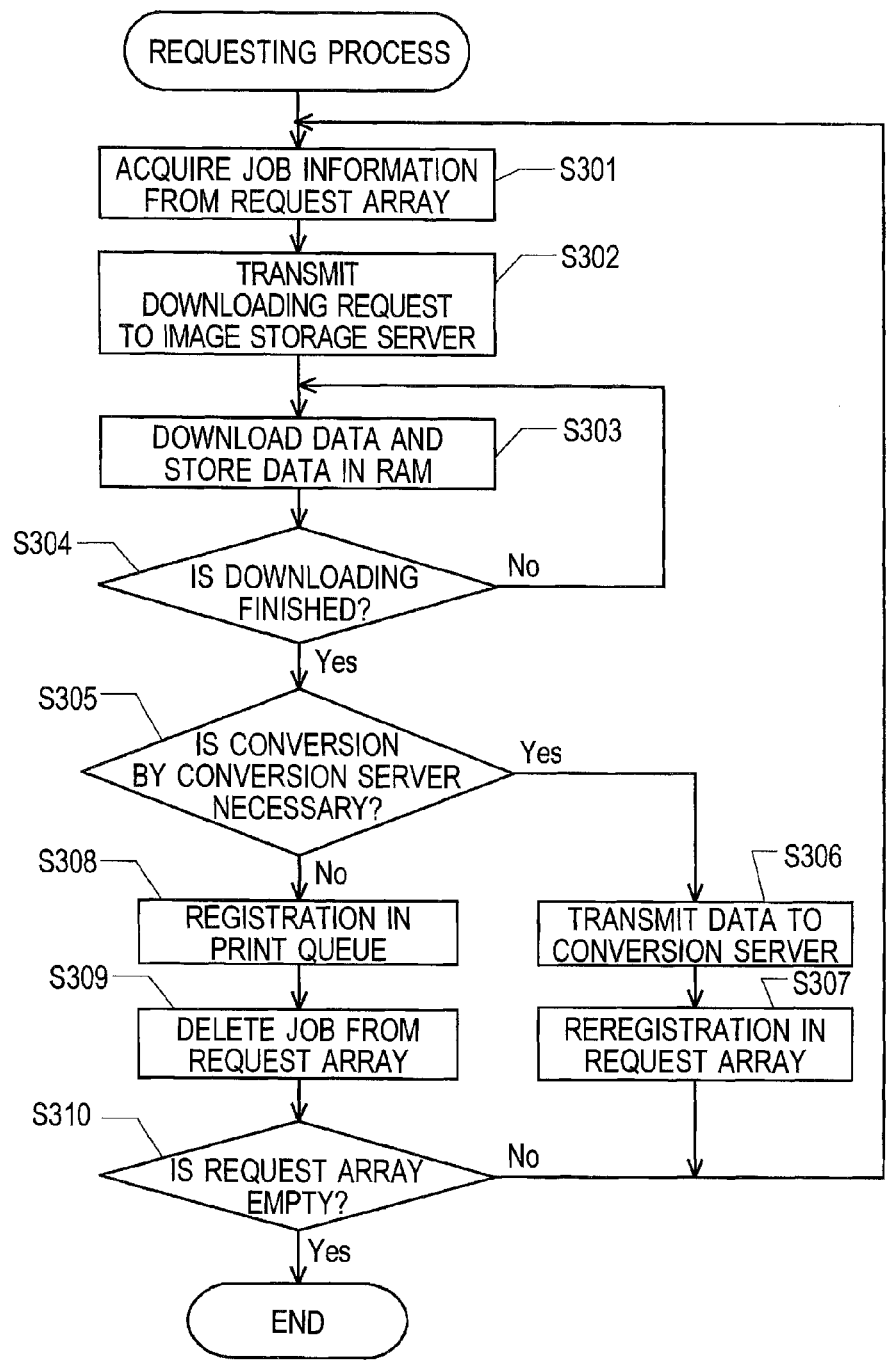
FIG. 7 is a flowchart showing the procedure of a requesting process.

Returning to FIG. 5, by the downloading-sequence determining process in S106, the request array 50 stores jobs based on print files in the determined downloading sequence. Thus, the CPU 31 of the MFP 100 requests downloading of image data from the image storage server 300, based on the request array 50. In order to do this, the CPU 31 executes a requesting process (S107). Next, the procedure of the requesting process in S107 will be described while referring to the flowchart of FIG. 7.

Upon starting execution of the requesting process, the CPU 31 of the MFP 100 acquires job information stored at the top of the request array 50 (S301). Specifically, the CPU 31 acquires a property of image data such as a URL of a download source of the job at the top (that is, a URL of a server or device that stores image data specified by the job at the top), and a print setting such as the number of print copies and color setting.

Next, based on the property of image data acquired in S301, the CPU 31 of the MFP 100 transmits a signal requesting downloading of the job at the top to the image storage server 300 (S302). Then, the CPU 31 downloads image data from the image storage server 300, and stores the image data in the RAM 33 (S303).

Further, the CPU 31 determines whether downloading of image data of the job is finished (S304). If downloading is not finished (S304: No), the CPU 31 returns to S303 and continues downloading until downloading is finished.

If downloading is finished (S304: Yes), the CPU 31 determines whether the downloaded image data requires a conversion process by the conversion server 200 (S305). If it is determined that the downloaded image data requires the conversion process (S305: Yes), the CPU 31 transmits the download image data to the conversion server 200 (S306).

Further, the CPU 31 reregisters (stores) a job including the transmitted image data in the request array 50 (S307). That is, the CPU 31 deletes the downloaded job from the request array 50, and newly stores a job including converted image data in the request array 50 as a job to be downloaded. Then, the CPU 31 returns to S301 and requests downloading of the next job. Note that the MFP 100 may put a job to be reregistered to the end of the request array 50, or may redetermine the downloading sequence while adding this job, as will be described later.

On the other hand, if it is determined that the downloaded image data does not require the conversion process by the conversion server 200 (S305: No), the CPU 31 stores the job information in a print queue (S308). At this time, the CPU 31 also stores the print setting information acquired in S301 in the print queue. If a job is stored in the print queue in a state where there is no job in the print queue, the CPU 31 of the MFP 100 determines the job to be an execution job. Then, the CPU 31 controls the image forming device 10 to start a printing process of the execution job. That is, by storing the job in the print queue, the CPU 31 of the MFP 100 controls the image forming device 10 to execute the printing process of the job.

The image forming device 10 executes the printing process based on a sequence in which jobs are stored in the print queue. Upon finishing printing, the CPU 31 deletes the execution job from the print queue. If the next job is stored in the print queue, the CPU 31 determines the next job to be the execution job. If no next job is stored in the print queue, the CPU 31 waits for a job to be stored in the print queue.

Further, the MFP 100 deletes the downloaded job from the request array 50 (S309). Next, the CPU 31 determines whether the request array 50 becomes empty as a result of S309 (S310). If the request array 50 is not empty (S310: No), the process returns to S301 and the CPU 31 requests downloading of the next job. On the other hand, if the request array 50 is empty (S310: Yes), the requesting process ends.

Figure 5:
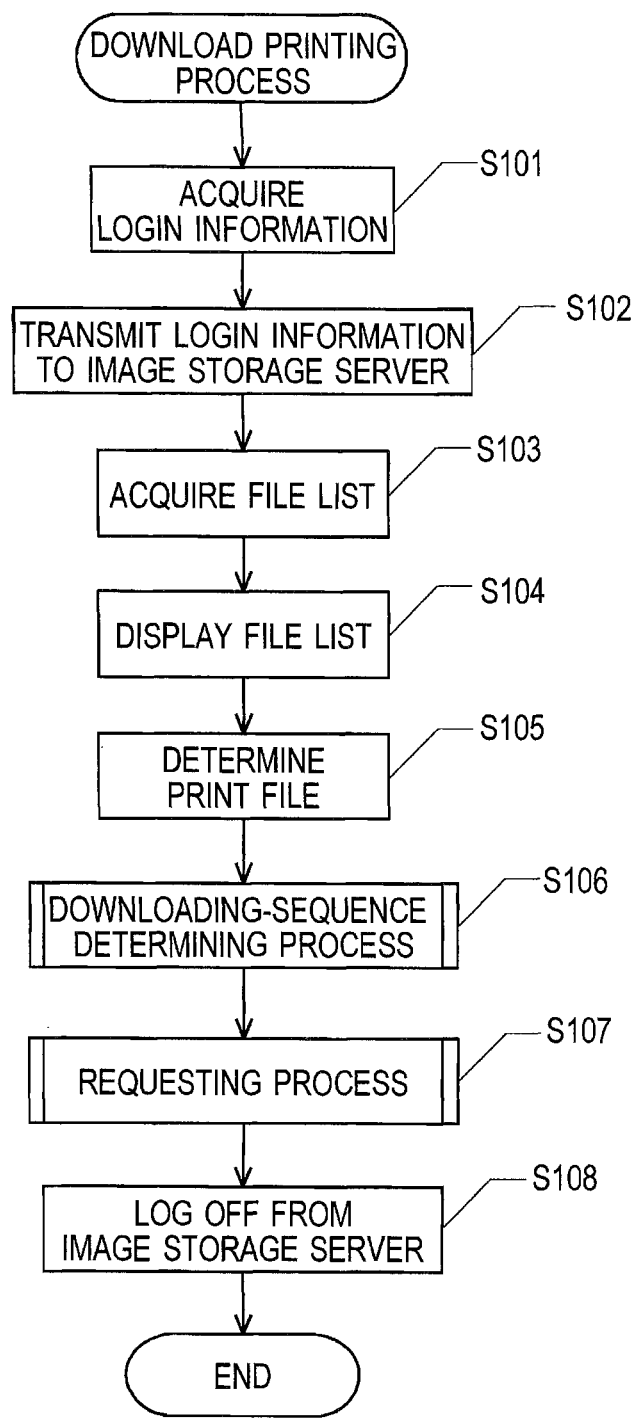
FIG. 5 is a flowchart showing the procedure of a download printing process.

Retuning to FIG. 5, by the requesting process in S107, downloading of all the jobs stored in the request array 50 ends. If the printing process by the image forming device 10 is not finished, the CPU 31 of the MFP 100 controls the image forming device 10 to continue the printing process based on the print queue. If a logoff instruction by the user is received, the CPU 31 of the MFP 100 transmits a logoff instruction to the image storage server 300 (S108), and finishes the download printing process.

That is, if the MFP 100 receives an instruction of download printing with selection of a plurality of files, the CPU 31 of the MFP 100 determines the downloading sequence such that data having a smaller data size is prioritized, as the predetermined rule. Accordingly, it is expected to shorten waiting time before the first sheet is printed. Further, if there is a plurality of data of the same rank, a different rule is applied. For example, as a different rule, the downloading sequence is determined by prioritizing a job requiring a conversion process by the conversion server 200. Accordingly, while the conversion process is executed at the conversion server 200, downloading of the next job can be performed. Thus, it is expected to shorten time required for the entire process of downloading and printing, and to shorten occupancy time of the image forming device 10 by one user.

Further, upon finishing downloading of a preceding job, the MFP 100 requests the image storage server 300 to transmit image data of a subsequent job, so as to start downloading of the subsequent job. That is, downloading of the subsequent job is started without waiting for completion of printing of the preceding job. Hence, printing of the preceding job and downloading of the subsequent job are executed in parallel. Thus, it is expected to shorten time required for the entire process of download printing.

Next, examples of other rules that are usable for determination of the downloading sequence will be described. The MFP 100 may apply a plurality of rules with a predetermined sequence. Or, the MFP 100 may have a plurality of rules, and the sequence of applying the plurality of rules may be determined based on a setting by an administrator, a state of the MFP 100, or the like.

For example, such a rule may be applied that, if there is a job that cannot be printed appropriately by the image forming device 10 at the time of starting download printing, the job that cannot be printed appropriately is placed in a subsequent position in the sequence. For example, in a state where color printing cannot be performed appropriately due to shortage of color toner of the image forming device 10, a job having a color print setting is placed in a subsequent position, in the sequence, to a job having a monochromatic print setting. Further, for example, by acquitting color information as a property of image data, usage or non-usage of each color of toner can be obtained in each job. If the usage or non-usage of each color of toner and the remaining amounts of toner in the image forming device 10 are obtained, a job using a color of which toner is short is placed in a subsequent position in the sequence. Further, for example, if the sheet feeding tray 90 designated as the sheet feeder is out of paper, the job may be placed in a subsequent position in the sequence. By applying these rules, it is possible to avoid a situation in which a printable job cannot be printed until toner or sheets are replenished.

In another rule, for example, a downloading sequence may be determined such that jobs are arranged serially in the sequence for each of the sheet feeding trays 90 that are designated by the jobs as print settings. That is, jobs for which the same sheet feeding tray 90 is designated as the sheet feeder are printed successively, so that the number of times of switching the sheet feeder can be reduced. By reducing the number of times of switching the sheet feeder, a waiting time for switching can be shortened, and it is expected that a total time required for download printing can be shortened, which is preferable. Further, the downloading sequence may be determined based on whether the print setting of a job is duplex printing (both-side printing).

Further, if download printing of a plurality of files is received and if an instruction of another download printing is newly received before downloading of all the files is finished, the downloading sequence may be redetermined. That is, the MFP 100 again determines the downloading sequence among print files included in a preceding download printing instruction and for which downloading has not started yet and print files included in a subsequent download printing instruction.

For example, as shown in FIG. 8, assume that the request array 50 including jobs J1 to J3 is generated by a preceding download printing instruction. The MFP 100 has started downloading of the job J1, and has not started downloading of the jobs J2 and J3. In this state, if jobs J4 and J5 are newly received by a subsequent download printing instruction, the MFP 100 performs the above-described downloading-sequence determining process (see FIG. 6) among the jobs J2 and J3 for which downloading has not started and the new jobs J4 and J5.

In this example, because the data size of the job J5 is smaller than the data size of the job J3, the job J5 is stored at a higher position in the request array 50 than the job J3. And, as shown in FIG. 9, the downloading sequence is redetermined. In this way, if an additional download printing instruction is received after a download printing instruction is received, the downloading sequence is redetermined among print files for which downloading has not started and print files that are newly selected. Thus, it is expected that time for finishing the entire download printing can be shortened.

As described above in detail, according to the MFP 100 of the present embodiment, when receiving an instruction of download printing in which image data is downloaded from the image storage server 300 and is printed, if a plurality of files is selected, a downloading sequence is determined based on a predetermined rule. In order to do this, the MFP 100 acquires at least one characteristic of a property of image data for which a print instruction is given and a print setting of the image data. The MFP 100 determines the sequence of requesting the image storage server 300 to transmit image data based on the acquired characteristic. Thus, compared with a case where transmission is requested in a uniform sequence such as the sequence of a file list, it is expected that the procedure of download printing is optimized. For example, if transmission is requested in the ascending sequence from a print file having a small data size, a printout of the first sheet can be obtained quickly. Or, if transmission is first requested for a job that requires processing by a device other than the controller (processor), it is expected that time required for the entire download printing can be shortened.

While the invention has been described in detail with reference to the above aspects thereof, it would be apparent to those skilled in the art that various changes and modifications may be made therein without departing from the scope of the claims.

For example, in addition to the MFP, the invention can be applied to an apparatus having a communication function and an image forming function, such as a copier and a facsimile apparatus.

Further, in the above-described embodiment, the content and the applying sequence of each rule used for determining the downloading sequence are just an example. For example, determination based on a data size may be omitted. Or, determination based on whether a conversion process is required may be prioritized over determination based on a data size. In this way, while the conversion server 200 performs a conversion process, jobs that do not require a conversion process can be sequentially downloaded from a job having a small data size, and can be printed.

Further, in the above-described embodiment, a data size is acquired from a property of image data of a print file. However, the data size may be inferred based on a file type of a print file or the number of print pages of a print file.

Further, in the above-described requesting process, once downloading of a preceding job is finished, downloading of a subsequent job is performed in parallel with a printing process of the preceding job. However, for example, downloading of the subsequent job may be started after the printing process of the preceding job is finished. That is, it is not always necessary that downloading and printing are performed at the same time. Further, in the above-described embodiment, a job is registered (entered) in a print queue after downloading of the entire job is completed. For example, however, a job may be registered in a print queue upon completion of downloading of image data of a predetermined amount that allows the image forming device 10 to start printing. In this case, too, a print queue is preferably deleted after printing of the entire job is finished.

Further, in the above-described embodiment, a job requiring a conversion process by the conversion server 200 is prioritized. Conversely, when a processing ability of the conversion server 200 is decreased, such a job may be placed in a subsequent position in the sequence. For example, in a case where a communication load is high or where the conversion server 200 has received a large number of conversion requests, it is expected that a conversion process by the conversion server 200 takes time. In that case, the priority sequence may be reversed.

Further, a process of acquiring a property of image data for download printing, a process of acquiring a print setting, and a process of determining a downloading sequence are not necessarily executed by the MFP 100. For example, these processes may be executed by the conversion server 200, or may be executed by another apparatus included in the printing system 1.

Further, in the above-described embodiment, if an instruction for printing a file requiring a conversion process is received, the MFP 100 first downloads the file from the image storage server 300, and subsequently transmits the file to the conversion server 200 for a conversion process. However, for example, if the image storage server 300 has a conversion function, that conversion function may be used. Or, the image storage server 300 may transmit image data to the conversion server 200, and the MFP 100 may download a file converted by the conversion server 200. Or, the image storage server 300 may transmit a file to the conversion server 200 for performing a conversion process, the conversion server 200 may return the converted file to the image storage server 300, and the MFP 100 may download the converted file from the image storage server 300.

For example, if the user is already logged in to the image storage server 300 at the time of receiving an instruction for starting the download printing process, the both steps S101 and S102 are skipped. Further, if download printing does not require login, the login step is unnecessary. That is, in the download printing process, the steps S101 and S102 are unnecessary. Further, for example, for a user who is allowed to log in to the MFP 100, login information to the image storage server 300 may be stored in the NVRAM 34. And, if the user who has logged in to the MFP 100 gives an instruction for downloading data from the image storage server 300, the MFP 100 may read out the stored login information and log in to the image storage server 300.

Further, in the above-described embodiment, the CPU 31 of the MFP 100 executes the procedure of FIG. 5. For example, however, another server (or PC) provided in the printing system 1 may execute the procedure of FIG. 5. In this case, this server can communicate with the MFP 100, the conversion server 200, and the image storage server 300 through the network.

The processes disclosed in the embodiment may be executed by hardware such as a single CPU, a plurality of CPUs, an ASIC etc., or a combination thereof. Further, the processes disclosed in the embodiment may be realized in various modes such as a storage medium storing program instructions for executing the processes, a method of executing the processes, and the like.

What is claimed is:

1. A printing apparatus comprising:
an interface;
a printing device configured to perform printing based on image files;
a processor; and
a memory storing instructions, the instructions, when executed by the processor, causing the processor to perform:
receiving a print instruction of controlling the printing device to print a plurality of image files stored in a server;
transmitting a first request to the server via the interface, the first request requesting the server to transmit, to the printing apparatus, attribute information with respect to each of the plurality of image files stored in the server, the attribute information being at least one of a property and a print setting with respect to each of the plurality of image files, the property including at least one of a data size, a file type, and color information of each of the plurality of image files;
receiving the attribute information with respect to each of the plurality of image files from the server via the interface;
determining a priority order of each of the plurality of image files based on the attribute information;
determining a sequence of downloading the plurality of image files based on the determined priority order;
transmitting a second request to the server via the interface based on the determined sequence, the second request requesting the server to transmit each of the plurality of image files;
receiving each of the plurality of image files from the server via the interface; and
controlling the printing device to print images based on each of the plurality of image files,
wherein the first request indicates a request to transmit the property of each of the plurality of image files, the property including the file type of each of the plurality of image files; and
wherein, when executed by the processor, the instructions further cause the processor to perform:
assigning the priority order to each of the plurality of image files based on the file type of each of the plurality of image files, such that an image file of a file type requiring a conversion process by an external device comes before an image file of a file type not requiring the conversion process.

2. The printing apparatus according to claim 1, wherein the first request indicates a request to transmit the property of each of the plurality of image files, the property including the data size of each of the plurality of image files; and
wherein, when executed by the processor, the instructions further cause the processor to perform:
assigning the priority order to each of the plurality of image files based on the data size of each of the plurality of image files.

3. The printing apparatus according to claim 2, wherein, when executed by the processor, the instructions further cause the processor to perform:
determining which one of the plurality of image files has a smallest data size; and
assigning a highest priority order to the determined one of the plurality of image files having the smallest data size.

4. The printing apparatus according to claim 1, wherein, when executed by the processor, the instructions further cause the processor to perform:
requesting, at timing after reception of a preceding image file is completed and before printing of the preceding image file is completed, transmission of a subsequent image file.

5. The printing apparatus according to claim 1, wherein, when executed by the processor, the instructions further cause the processor to perform:
receiving a processing ability of the external device; and
in response to determination that the processing ability is decreased, reversing the priority order such that the image file of the file type not requiring the conversion process comes before the image file of the file type requiring the conversion process.

6. The printing apparatus according to claim 1, wherein the server has a conversion function of performing the conversion process, and the server also serves as the external device that performs the conversion process.

7. The printing apparatus according to claim 1, wherein the first request indicates a request to transmit the print setting of each of the plurality of image files, the print setting including a number of print copies of each of the plurality of image files; and
wherein, when executed by the processor, the instructions further cause the processor to perform:
assigning the priority order to each of the plurality of image files based on the print setting of each of the plurality of image files, such that an image file of multiple copies comes before an image file of a single copy.

8. The printing apparatus according to claim 1, wherein the first request indicates a request to transmit the property and the print setting of each of the plurality of image files, the property including color information of each of the plurality of image files, the print setting including a color setting of each of the plurality of image files; and
wherein, when executed by the processor, the instructions further cause the processor to perform:
determining whether a colorant shortage error occurs at the printing device; and
assigning the priority order to each of the plurality of image files based on the property and the print setting of each of the plurality of image files, such that, in response to occurrence of the colorant shortage error, an image file not using colorant corresponding to the colorant shortage error comes before an image file using the colorant corresponding to the colorant shortage error.

9. The printing apparatus according to claim 1, further comprising a plurality of sheet feeders each configured to feed a sheet,
wherein the first request indicates a request to transmit the print setting of each of the plurality of image files, the print setting including a setting relating to the plurality of sheet feeders; and wherein, when executed by the processor, the instructions further cause the processor to perform:

assigning the priority order to each of the plurality of image files based on the print setting of each of the plurality of image files, such that image files for which a same sheet feeder is designated are printed successively.

10. The printing apparatus according to claim 1, further comprising a plurality of sheet feeders each configured to feed a sheet, wherein the first request indicates a request to transmit the print setting of each of the plurality of image files, the print setting including a setting relating to the plurality of sheet feeders; and wherein, when executed by the processor, the instructions further cause the processor to perform:

determining whether a sheet feeder designated for each of the plurality of image files is out of sheets; and assigning the priority order to each of the plurality of image files based on the print setting of each of the plurality of image files, such that, in response to determination that the sheet feeder designated for a certain image file is out of sheets, the certain image file is placed in a subsequent position in the priority order.

11. The printing apparatus according to claim 1, wherein, when executed by the processor, the instructions further cause the processor to perform:

determining whether there is an image file of which transmission from the server is not started when the print instruction is received; and in response to determination that there is an image file of which transmission from the server is not started when the print instruction is received, redetermining the sequence of a new set of image files based on the priority order, the new set of image files including both the image file of which transmission from the server is not started and an image file for which the print instruction is newly received.

12. The printing apparatus according to claim 1, wherein, when executed by the processor, the instructions further cause the processor to perform:

assigning the priority order to the plurality of image files based on a first rule;

determining whether that there are two or more image files of a same rank in the assigned priority order; and in response to determination that there are two or more image files of the same rank, assigning an additional priority order to the two or more image files based on a second rule different from the first rule.

13. A printing apparatus comprising:

an interface;

a printing device configured to perform printing based on image files;

a processor; and a memory storing instructions, the instructions, when executed by the processor, causing the processor to perform:

receiving a print instruction of controlling the printing device to print a plurality of image files stored in a server;

transmitting a first request to the server via the interface, the first request requesting the server to transmit, to the printing apparatus, attribute information with respect to each of the plurality of image files stored in the server, the attribute information being at least one of a property and a print setting with respect to each of the plurality of image files, the property including at least one of a data size, a file type, and color information of each of the plurality of image files;

receiving the attribute information with respect to each of the plurality of image files from the server via the interface;

determining a priority order of each of the plurality of image files based on the attribute information;

determining a sequence of downloading the plurality of image files based on the determined priority order;

transmitting a second request to the server via the interface based on the determined sequence, the second request requesting the server to transmit each of the plurality of image files;

receiving each of the plurality of image files from the server via the interface; and controlling the printing device to print images based on each of the plurality of image files, wherein the first request indicates a request to transmit the print setting of each of the plurality of image files, the print setting including a number of print copies of each of the plurality of image files; and wherein, when executed by the processor, the instructions further cause the processor to perform:

assigning the priority order to each of the plurality of image files based on the print setting of each of the plurality of image files, such that an image file of multiple copies comes before an image file of a single copy.

14. The printing apparatus according to claim 13, wherein the first request indicates a request to transmit the property of each of the plurality of image files, the property including the data size of each of the plurality of image files; and wherein, when executed by the processor, the instructions further cause the processor to perform:

assigning the priority order to each of the plurality of image files based on the data size of each of the plurality of image files.

15. A printing apparatus comprising:

an interface;

a printing device configured to perform printing based on image files;

a processor; and a memory storing instructions, the instructions, when executed by the processor, causing the processor to perform:

receiving a print instruction of controlling the printing device to print a plurality of image files stored in a server;

transmitting a first request to the server via the interface, the first request requesting the server to transmit, to the printing apparatus, attribute information with respect to each of the plurality of image files stored in the server, the attribute information being at least one of a property and a print setting with respect to each of the plurality of image files, the property including at least one of a data size, a file type, and color information of each of the plurality of image files;

receiving the attribute information with respect to each of the plurality of image files from the server via the interface;

determining a priority order of each of the plurality of image files based on the attribute information;

determining a sequence of downloading the plurality of image files based on the determined priority order;

transmitting a second request to the server via the interface based on the determined sequence, the second request requesting the server to transmit each of the plurality of image files;

receiving each of the plurality of image files from the server via the interface; and controlling the printing device to print images based on each of the plurality of image files, wherein the first request indicates a request to transmit at least one of the property and the print setting of each of the plurality of image files; and wherein, when executed by the processor, the instructions further cause the processor to perform:

determining whether an error occurs at a particular device of the printing apparatus; and assigning the priority order to each of the plurality of image files based on at least one of the property and the print setting of each of the plurality of image files, such that, in response to occurrence of the error, an image file corresponding to the error is placed in a subsequent position in the priority order.

16. The printing apparatus according to claim 15, wherein the first request indicates a request to transmit the property and the print setting of each of the plurality of image files, the property including color information of each of the plurality of image files, the print setting including a color setting of each of the plurality of image files;

wherein the error is a colorant shortage error that occurs at the printing device; and wherein the assigning comprising assigning the priority order to each of the plurality of image files based on the property and the print setting of each of the plurality of image files, such that, in response to occurrence of the colorant shortage error, an image file not using colorant corresponding to the colorant shortage error comes before an image file using the colorant corresponding to the colorant shortage error.

17. The printing apparatus according to claim 15, further comprising a plurality of sheet feeders each configured to feed a sheet, wherein the first request indicates a request to transmit the print setting of each of the plurality of image files, the print setting including a setting relating to the plurality of sheet feeders;

wherein the error is an out-of-sheet error that a sheet feeder designated for each of the plurality of image files is out of sheets; and wherein the assigning comprising assigning the priority order to each of the plurality of image files based on the print setting of each of the plurality of image files, such that, in response to determination that the sheet feeder designated for a certain image file is out of sheets, the certain image file is placed in a subsequent position in the priority order.

18. A printing apparatus comprising:
an interface;
a printing device configured to perform printing based on image files;
a processor; and
a memory storing instructions, the instructions, when executed by the processor, causing the processor to perform:
receiving a print instruction of controlling the printing device to print a plurality of image files stored in a server;
transmitting a first request to the server via the interface, the first request requesting the server to transmit, to the printing apparatus, attribute information with respect to each of the plurality of image files stored in the server, the attribute information being at least one of a property and a print setting with respect to each of the plurality of image files, the property including at least one of a data size, a file type, and color information of each of the plurality of image files;

receiving the attribute information with respect to each of the plurality of image files from the server via the interface;

determining a priority order of each of the plurality of image files based on the attribute information;

determining a sequence of downloading the plurality of image files based on the determined priority order;

transmitting a second request to the server via the interface based on the determined sequence, the second request requesting the server to transmit each of the plurality of image files;

receiving each of the plurality of image files from the server via the interface; and controlling the printing device to print images based on each of the plurality of image files, further comprising a plurality of sheet feeders each configured to feed a sheet, wherein the first request indicates a request to transmit the print setting of each of the plurality of image files, the print setting including a setting relating to the plurality of sheet feeders; and wherein, when executed by the processor, the instructions further cause the processor to perform:

assigning the priority order to each of the plurality of image files based on the print setting of each of the plurality of image files, such that image files for which a same sheet feeder is designated are printed successively.

19. A printing apparatus comprising:
an interface;
a printing device configured to perform printing based on image files;
a processor; and
a memory storing instructions, the instructions, when executed by the processor, causing the processor to perform:
receiving a print instruction of controlling the printing device to print a plurality of image files stored in a server;
transmitting a first request to the server via the interface, the first request requesting the server to transmit, to the printing apparatus, attribute information with respect to each of the plurality of image files stored in the server, the attribute information being at least one of a property and a print setting with respect to each of the plurality of image files, the property including at least one of a data size, a file type, and color information of each of the plurality of image files;

receiving the attribute information with respect to each of the plurality of image files from the server via the interface;

determining a priority order of each of the plurality of image files based on the attribute information;

determining a sequence of downloading the plurality of image files based on the determined priority order;

transmitting a second request to the server via the interface based on the determined sequence, the second request requesting the server to transmit each of the plurality of image files;

receiving each of the plurality of image files from the server via the interface; and controlling the printing device to print images based on each of the plurality of image files, wherein, when executed by the processor, the instructions further cause the processor to perform:

determining whether there is an image file of which transmission from the server is not started when the print instruction is received; and in response to determination that there is an image file of which transmission from the server is not started when the print instruction is received, redetermining the sequence of a new set of image files based on the priority order, the new set of image files including both the image file of which transmission from the server is not started and an image file for which the print instruction is newly received.

20. A printing apparatus comprising:

an interface;

a printing device configured to perform printing based on image files;

a processor; and a memory storing instructions, the instructions, when executed by the processor, causing the processor to perform:

receiving a print instruction of controlling the printing device to print a plurality of image files stored in a server;

transmitting a first request to the server via the interface, the first request requesting the server to transmit, to the printing apparatus, attribute information with respect to each of the plurality of image files stored in the server, the attribute information being at least one of a property and a print setting with respect to each of the plurality of image files, the property including at least one of a data size, a file type, and color information of each of the plurality of image files;

receiving the attribute information with respect to each of the plurality of image files from the server via the interface;

determining a priority order of each of the plurality of image files based on the attribute information;

determining a sequence of downloading the plurality of image files based on the determined priority order;

transmitting a second request to the server via the interface based on the determined sequence, the second request requesting the server to transmit each of the plurality of image files;

receiving each of the plurality of image files from the server via the interface; and controlling the printing device to print images based on each of the plurality of image files, wherein, when executed by the processor, the instructions further cause the processor to perform:

assigning the priority order to the plurality of image files based on a first rule;

determining whether that there are two or more image files of a same rank in the assigned priority order; and in response to determination that there are two or more image files of the same rank, assigning an additional priority order to the two or more image files based on a second rule different from the first rule.

* * * * *